United States Patent [19]

McDonald

[11] Patent Number: 4,793,200
[45] Date of Patent: Dec. 27, 1988

[54] REVERSE IDLER GEAR NOISE-REDUCTION ARRANGEMENT

[75] Inventor: Robert L. McDonald, Livonia, Mich.

[73] Assignee: Chrysler Motors Corporation, Highland Park, Mich.

[21] Appl. No.: 122,966

[22] Filed: Nov. 19, 1987

[51] Int. Cl.$^4$ ............................................. F16H 3/08
[52] U.S. Cl. ........................................ 74/331; 74/392; 74/396; 74/411
[58] Field of Search ............... 74/333, 360, 361, 363, 74/369, 375, 377, 396, 397, 404, 406, 409, 410, 411, 392, 329, 331

[56] References Cited

U.S. PATENT DOCUMENTS

| | | | |
|---|---|---|---|
| 2,460,630 | 2/1949 | Fawick | 74/411 |
| 2,867,130 | 1/1959 | Moeller | 74/443 |
| 3,320,824 | 5/1967 | Riley, Jr. | 74/443 |
| 3,381,548 | 5/1968 | Wolkenstein | 74/410 X |
| 3,798,990 | 3/1974 | Knappe et al. | 74/411 |
| 3,854,349 | 12/1974 | Michling | 74/411 X |
| 4,312,244 | 1/1982 | Barnes et al. | 74/410 |
| 4,324,152 | 4/1982 | Oshima et al. | 74/473 R X |
| 4,375,171 | 3/1983 | Morscheck | 74/331 |
| 4,570,504 | 2/1986 | Sitta et al. | 74/406 X |
| 4,700,582 | 10/1987 | Bessette | 74/411 X |

Primary Examiner—Leslie A. Braun
Assistant Examiner—Dwight G. Diehl
Attorney, Agent, or Firm—Edward P. Barthel

[57] ABSTRACT

A reverse idler gear shaft noise dampening arrangement for an automotive manual transmission. The reverse gear idler shaft has its free end resiliently centered in axially spaced aligned transmission housing bores by a pair of elastomeric O-rings. The bore centering O-rings position the idler shaft principal axis a predetermined distance closer to the principal axes of both the transmission output shaft and counter shaft with the transmission in its forward drive modes biasing the reverse idler gear teeth into positive contact with both the output shaft and countershaft reverse gear teeth thereby obviating backlash gear rattle. Upon reverse drive torque being transmitted from the countershaft reverse gear to the output shaft reverse gear via the idler shaft reverse gear, the reverse gear separation forces cause the O-rings to deflect from their foreward drive mode biasing state allowing the idler shaft principal axis to move a predetermined off-center distance away from both the output shaft and counter shaft principal axes. The off-center positioning of the idler shaft enables normal designed reverse torque transfer between the meshed teeth of the idler shaft reverse gear with the output shaft and countershaft reverse gears obviating excess wear of the gear teeth.

3 Claims, 2 Drawing Sheets

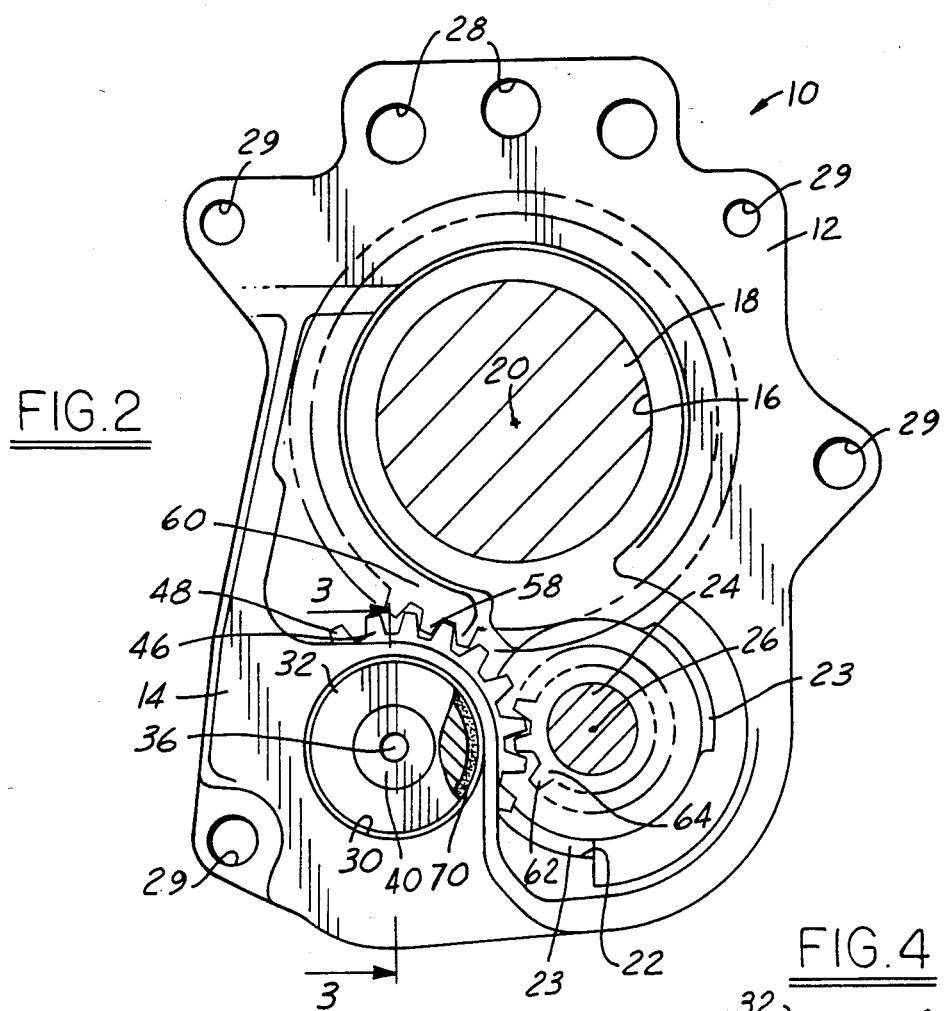
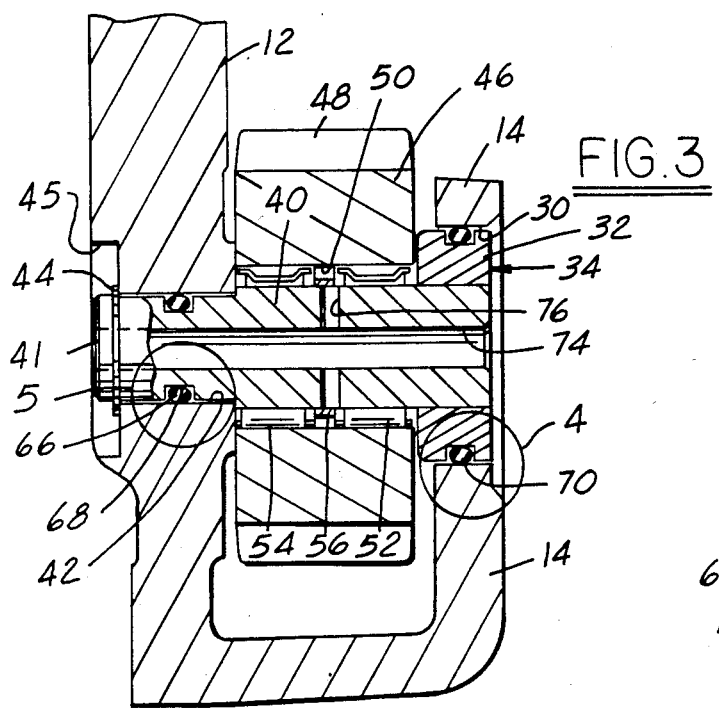
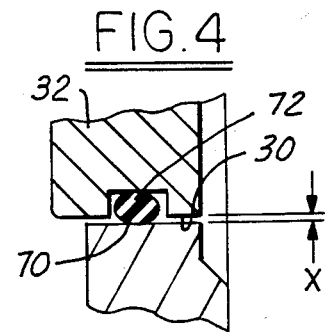
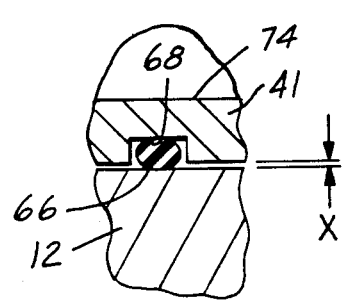

REVERSE IDLER GEAR NOISE-REDUCTION ARRANGEMENT

BACKGROUND OF THE INVENTION

This invention relates to vehicle transmission gearing and, more particularly, to an improved noise-reduction mounting for the reverse idler gear shaft of a vehicle manual transmission.

The prior art is replete with noise-suppressing gear arrangements. One example is found in U.S. Pat. No. 3,320,824 issued May 23, 1967 to P. H. Riley, Jr. et al. The Riley patent concerns a gear mounted on a splined shaft wherein tolerance accumulations may cause slight angular misalignments between the mating splines inducing vibratory noises during operation. Riley discloses noise-suppressing cushioning O-rings encircling the gear supporting shaft on either side of the gear. The O-rings are held under axial compression between the gear and a suitable retaining element such that the O-rings are deformed into firm engagement with a side face of the gear and with the shaft. The O-rings function to define a space to trap lubricant between the gear and the supporting shaft such that a film of lubricant is maintained to minimize metal-to-metal contact.

The U.S. Pat. No. 2,867,130 issued Jan. 6, 1959 to K. G. F. Moeller relates to reduction of gear noise such as devices attached to meshing gears for damping the noise produced when the gear teeth contact one another during operation. Moeller teaches using a pair of sound absorbing disks mounted on opposite sides of a gear in conjunction with an elastic ring located in a peripheral groove of the disks.

The U.S. Pat. No. 4,503,719 issued Mar. 12, 1985 to Hamano discloses a buffering mechanism for an automotive starter in which elastic members are provided in spaces defined between circumferentially opposed sides of depressions formed in the outer periphery of a ring gear of a planetary gear set and the inner periphery of a member receiving a reaction force.

The U.S. Pat. No. 3,854,349 issued Dec. 17, 1974 to Michling discloses a multi-stage speed reducer resilient shaft support. Michling discloses a speed reducer drive yieldingly mounting the output end of a central gear within the hollow shaft of a planet gear carrier of the output stage by means of resilient elements providing transverse limiting of movement. These elements are positioned and arranged such that upon removal of the load from the drive gear of the system, the resiliency or restoring force of the elements effect centering of the shaft journals of the central gear against the weight thereof.

The U.S. Pat. No. 3,408,830 issued Nov. 5, 1968 to A. Sutaruk et al discloses a torsion drive assembly wherein a rubber grommet has its inner periphery press fitted onto a torsion shaft sleeve. The rubber grommet functions as a dampener and aids in dampening the noise due to impact or shock loads imparted to the drive assembly as well as serving to maintain the sleeve concentric with the longitudinal axis of the torsion shaft. This maintains radial space therebetween and thus prevents rattling and fretting wear between the mating splines as the input member and the torsion sleeve.

The U.S. Pat. No. 2,460,630 issued Feb. 1, 1949 to T. L. Fawich discloses a multicushioned gear having cushioning means interposed between its toothed portion and its hub which engages the machine part on which the gear is mounted.

SUMMARY OF THE INVENTION

It is an object of the present invention to provide an improved vehicle manual transmission gear train wherein reverse idler gear backlash gear rattle and idler shaft assembly vibration noise, produced when th idler gear is revolved in a non-torque transmitting manner during forward drive modes of the transmission, is dampened by a reverse idler shaft assembly resilient O-ring mounting arrangement.

It is another object of the present invention to provide a reverse idler gear shaft assembly resilient O-ring mounting arrangement for a manual transmission as set forth above wherein the idler shaft assembly ends are concentrically centered in aligned spaced bores by resilient O-rings such that the idler shaft principal axis is biased a predetermined distance closer to the principal axes of both the transmission main shaft and counter shaft with the transmission in any o its forward drive modes. As a result the reverse idler gear teeth run in preloaded meshed condition relative to both the output shaft and counter shaft reverse gear teeth into the forward drive modes when the reverse gears are not transmitting drive torque. Thus, backlash gear rattle between the reverse gear meshed teeth is obviated in the forward drive modes.

It is still another object of the present invention to provide an improved vehicle manual transmission reverse idler gear shaft assembly mounting arrangement as set forth above wherein one end of the idler shaft is resiliently mounted in a transmission housing midship main plate bore and its axially spaced flange portion bore by means of resilient O-rings adjacent the thrust head and shank end portions of the idler shaft assembly thereby obviating reverse gear idler shaft assembly vibrations from being transferred from the midship mounting plate to the transmission housing.

A further feature of the invention involves an reverse idler gear shaft assembly mounting arrangement as set forth above wherein a predetermined variable-center positioning of the ends of the reverse idler shaft shank and head portions is provided in oversized aligned bores by elastomeric O-rings. In the forward drive modes the O-rings concentrically center the idler shaft head end and shank end portions in their respective bores such that the reverse idler gear teeth are resiliently biased into pressure contact with both the output shaft reverse drive gear teeth and the counter shaft reverse gear teeth thereby obviating backlash gear rattle between of the three reverse gears. In the reverse drive mode the separation forces developed by the three reverse gears are sufficient to compress the O-rings thereby transferring the reverse idler shaft principal axis a predetermined off-center distance away from the axes of both the output shaft and the counter shaft. This results in the intermeshed teeth of the three reverse gears being in predetermined designed driving relationship for transferring reverse torque from the counter shaft to the output shaft via the idler shaft assembly. Thus, applicant's invention obviates excessive tooth wear, such as spalling, at the mating faces of the meshed reverse gear teeth during the reverse drive mode of the transmission.

BRIEF DESCRIPTION OF THE DRAWINGS

Further features and advantages of the invention will become apparent to those skilled in the art upon reference to the following description and accompanying drawings in which:

FIG. 2 is a front elevational view of the reverse idler gear midship mounting plate with parts broken away shown in FIG. 1;

FIG. 3 is a vertical cross-sectional view taken on the line 3—3 of FIG. 2; and

FIG. 4 is an enlarged, fragmentary cross-sectional view of the area enclosed by construction circle 4 of FIG. 3.

FIG. 5 is an enlarged, fragmentary cross-sectional view of the area enclosed by construction circle 5 of FIG. 3.

DETAILED DESCRIPTION OF THE PREFERRED EMBODIMENT

Figure 1:
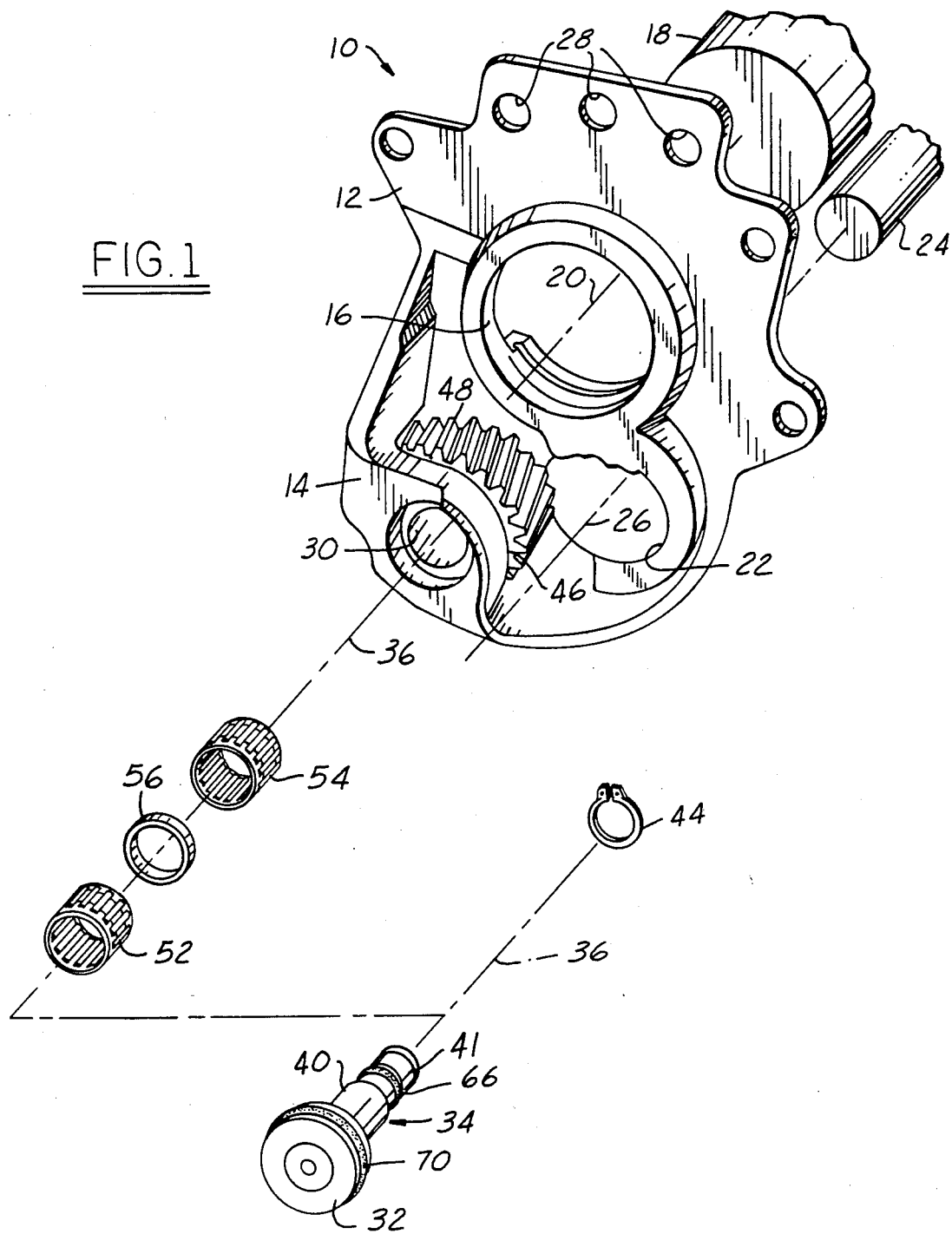
FIG. 1 is an exploded perspective view of a reverse idler gear, idler gear shaft and midship mounting plate of a manual transmission constructed in accordance with the present invention.

Turning now to the drawings in detail, and first to FIG. 1 thereof, it will be seen that the embodiment of the invention here illustrated comprises a midship mounting plate, generally indicated at 10, of an automotive manual transmission. Reference may be made to U.S. Pat. No. 4,633,730 issued Jan. 6, 1987 to J. M. Scalisi et al. for a description of a typical automotive manual five-speed transmission disclosing a prior art midship mounting plate. The disclosure of the '730 patent, assigned to the assignee of the instant application, is incorporated by reference herein.

The midship mounting plate comprises a main plate portion 12 and a reverse gear flange portion 14 integral with and in parallel spaced relation to the main plate portion 12. The main plate portion 12 includes a central circular opening 16 for journalled reception by caged ball bearings (not shown) of transmission main drive or output shaft 18 therethrough, shown in FIG. 1, with its principal axis 20 aligned in circular opening 16. The main plate portion 12 further includes an offset lower circular opening 22 for journalled reception by caged needle bearings 23 receiving the transmission countershaft 24 therethrough, shown in FIG. 1 with its principal axis 26 aligned in opening 22. The main plate includes three upper holes 28 sized to slidably receive an associated longitudinally extending shift fork rail (not shown) for reciprocal travel therein. Reference may be made to the above-mentioned '730 patent for a detailed description of the transmission shaft rail operation.

It will be noted that the midship plate 10 has a plurality of attachment holes 29 adapted to receive suitable fasteners such as threaded bolts (not shown) for securing the midship plate to the transmission casing or housing shown in the mentioned '730 patent. Thus, any reverse gear idler shaft vibrations applied to the midship plate 10 will be transferred directly to the transmission housing via their contact mating surfaces surrounding the fasteners in holes 29. The reverse gearset idler shaft assembly resilient O-ring mounting arrangement, to be described, is operative to dampen the passage of any audible idler shaft noise vibrations to th transmission housing via the midship plate 10 while obviating reverse gear rattle due to gear backlash.

FIGS. 1 and 3 show the reverse gear plate flange portion 14 formed with a through bore 30 adapted to rotatable receive therein a ring-shaped thrust head portion 32 suitably secured, as by a press fit, on one end of a reverse idler shaft assembly, generally indicated at 34.

As seen in FIGS. 1 and 2 the reverse idler shaft assembly 34 has its principal axis 36 positioned below and offset to the left of the parallel output shaft principal axis 20. It will be noted that the countershaft principal axis 26 is positioned below and offset to the right of parallel main shaft principal axis 20. Further, it will be seen by the arrows in FIG. 2 that the output shaft 18 and the countershaft 24 are both rotated in a clockwise direction by the engine crank shaft (not shown) while the idler shaft 34 is rotated in a counter clockwise direction.

As seen in FIG. 3 the reverse idler shaft assembly 34 includes a elongated shaft 40 formed at one end with a reduced diameter shank portion 41 extending through main plate portion through bore 42 and retained therein by C-snap ring 44 received in counter bore 45. The idler shaft assembly 34 further includes a reverse idler gear 46 journally supported on the idler shaft 40. The revers idler gear, having peripheral spur teeth 48, is journally supported by means of its central bore 50 surrounding two sets of needle bearings 52 and 54 axially spaced by an intermediate bearing separation washer 56.

FIG. 2 shows the reverse idler gear teeth 48 meshing with both teeth 58 of output shaft reverse gear 60 and teeth 62 of countershaft reverse gear 64. It will be noted that in the preferred form of the invention the countershaft reverse gear 64 is a cluster type gear in that it is formed integral with the countershaft 24. It will also be noted that the reverse gear 60 is journally supported on the output shaft 18 and that it is clutched to the output shaft 18 upon a conventional reverse shift fork operated synchronizer (not shown) being moved forwardly. Reference may be made to the above mentioned '730 Scalisi patent for a description of one form of fork and synchronizer arrangement for a constant-mesh manual transmission.

Upon the reverse shift fork (not shown) being shifted forwardly it engages or clutches output shaft reverse gear 60 to the output shaft for clockwise torque receiving rotation. As the countershaft 24 is being constantly driven by the vehicle engine in a clockwise direction (as viewed in FIG. 1) the counter shaft reverse gear 62 is, in turn, constantly rotating the reverse idler gear 46 in a counter clockwise direction. Thus, upon the output shaft reverse gear 60 being clutched to the output shaft 18 reverse drive torque is transferred from the countershaft reverse gear 64 to the output shaft reverse gear via the idler shaft reverse gear. The countershaft 24 thereby delivers reverse drive torque to the output shaft 18 causing the output shaft 18 to rotate in a clockwise direction to produce reverse motion of the vehicle. Thus the reverse idler gear simply transmits motion, but has no effect on the rate of speed of the driven countershaft reverse gear 62.

With reference to FIG. 3, it will be seen that a first resilient annular O-ring 66 is seated in idler shaft 40 circumferential groove 68. The O-ring 66 is sized to normally center the idler shaft 40 shank end in the main plate bore 42 during the transmission's forward drive mode. The O-ring 66 is located in pressure contact with idler shaft through bore 42 of midship plate main portion 12.

A second resilient annular O-ring 70 is seated in circumferential groove 72 formed in the idler shaft thrust head portion 32. The O-ring 70 is located in pressure contact with idler shaft through bore 30 formed in midship plate flange portion 14. It will be noted that the reverse idler shaft 40 is formed with an axial central lubrication bore 74. A cross-bore 76 communicates with the central bore 74 and allows constant passage of lubricant to extend from the central bore to the needle bearings 52 and 54.

It will be appreciated that the idler shaft assembly 34 is resiliently mounted by means of first 66 and second 70 elastomeric O-rings in the main plate portion bore 42 and the aligned idler plate portion bore 30, respectively. Thus, the principal axis 36 of the idler shaft 40 is concentrically centered in the aligned bores 30 and 42 during the forward drive modes of the transmission. The O-ring 70 is sized to provide a predetermined uniform annular clearance "X", as seen in FIG. 4, between the idler shaft thrust head portion 32 and the idler plate flange portion bore 30 during torque transfer, i.e. when the transmission is in its reverse drive mode. Similarly, the O-ring 66 is sized to provide the identical annular clearance "X", as seen in FIG. 5, between the idler shaft shank end portion 41 and the main plate portion bore 42 during reverse mode torque transfer.

It will be noted that the O-rings 66 and 70 are formed so that a cross-section of their annular bodies are normally circular. Thus, in the transmission forward drive modes idler shaft centering arrangement of FIG. 3 the O-rings 66 and 70 are shown compressed into an out-of-round or elliptical-like cross-section. This occurs because the reverse idler gear teeth 48 are in preloaded biased contact with their associated output shaft reverse gear teeth 58 and countershaft reverse gear teeth 62. Upon the transmission being shifted into its reverse drive mode the output shaft reverse gear 18 is engaged or clutched the output shaft to receive reverse driving torque from the countershaft reverse gear 64 via the reverse idler gear 32.

In the reverse drive mode the gear separation forces are such that the principal axis 36 of the idler shaft is moved a predetermined distance away from the principal axes of both the output shaft 18 and countershaft 24. This occurs by virtue of arcuate portions of the O-rings being further compressed allowing the idler shaft principal axis 36 to be moved a predetermined distance off-center relative to the center line of the aligned bores 30 and 42. In the disclosed embodiment during the forward drive modes the principal axis 36 of the idler shaft is about 0.15 mm closer to both the principal axes 20 and 26 of the output shaft and counter shaft, respectively that normal design practice dictates or allows. This causes the idler gear teeth 48 to run in a resiliently biased or "preloaded" noise suppressing state with both the output shaft reverse gear teeth 58 and the countershaft reverse gear teeth 62 so as to obviate gear backlash.

In the disclosed embodiment the outer diameter of the idler shaft thrust head portion 32 is about 0.30 mm smaller than the internal diameter of the midship main plate bore 30. Similarly, the diameter of the idler shaft shank portion 41 is about 0.30 mm smaller than the internal diameter of the flange plate bore 42. As a result the predetermined radial O-ring biased clearance distances "X" maintained during the transmission forward drive modes are equal with each about 0.15 mm. These dimensional relations allow the idler reverse gear shaft assembly to further compress portions of the O-rings such that its principal axis 36 is positioned in its off-center state, relative to the centers of the bores 30 and 42, during reverse drive mode of the transmission.

It will be noted that the idler shaft 40 is essentially retained against rotation by the O-rings 66 and 70 during either forward or reverse drive modes of the transmission. However, some slight rotation or "creep" of the idler shaft may occur under certain operating conditions.

While only one embodiment of this invention has been shown and described, those skilled in the art will appreciate that other forms of the invention may be possible without departing from the scope of the following claims.

What is claimed is:

1. In a vehicle manual transmission supported within a housing and shiftable into a plurality of forward drive modes and a reverse drive mode, said transmission housing having a transversely extending midship plate mounted therein, an output shaft journally supported in a midship plate first opening for rotation about its principal axis, a countershaft journally supported in a midship plate second opening for rotation about its principal axis, a reverse gear train arrangement including a reverse drive gear journally supported on said output shaft and adapted for rotation therewith about said output shaft principal axis, a countershaft reverse gear fixedly supported on said countershaft for rotation therewith about said countershaft principal axis, said midship plate including an idler shaft mounting flange portion positioned parallel to and axially spaced from said midship plate, a reverse idler gear shaft having its ends supported in first and second longitudinally aligned axially spaced bores in said midship plate and flange portion respectively, a reverse idler gear journally supported on said idler shaft intermediate said first and second aligned bores having its teeth in constant mesh with the teeth of both said output shaft reverse gear and said countershaft reverse gear, said idler shaft reverse gear adapted for rotation about the principal axis of said idler shaft, the improvement comprising:

said idler shaft having said first end resiliently supported in said first bore by a first elastomeric O-ring and said second end resiliently supported in said second bore by a second O-ring;

said first and second O-rings of a size relative to their associated bores such that with said transmission being shifted into any of said forward drive modes said reverse idler shaft principal axis is centered in said aligned bores so as to be located a first predetermined distance from each said output shaft and said countershaft principal axes, whereby the teeth of said reverse idler gear are resiliently biased into preloaded face contact with the teeth of both the output shaft reverse drive gear and the countershaft reverse gear during said forward drive modes wherein no drive torque is transmitted between said three meshed reverse gears, thereby obviating backlash gear rattle and idler shaft audible vibration noise transmission to the housing via said midship plate;

and whereby upon driving torque being transmitted between said three gears during said reverse driving mode the resulting gear separation forces being sufficient to compress said O-rings whereby the principal axis of said reverse idler gear shaft principal axis is positioned a predetermined distance off-center relative to said first and second bores and away from both principal axes of said output shaft and said countershaft such that said reverse idler gear teeth are positioned in a normal designed reverse drive torque transmitting manner with said output shaft reverse drive gear teeth and said countershaft reverse gear teeth thereby obviating excessive wear of said reverse gear teeth during reverse drive torque transfer therebetween.

2. The transmission reverse gear idler shaft arrangement as set forth in claim 1, wherein said idler shaft first end in the form of a circular shank portion having a smaller diameter than said idler shaft and said idler shaft second end in the form of an enlarged circular thrust head portion, whereby a predetermined uniform concentric clearance is provided between the diameter of said shank portion and the diameter of said first bore by said first O-ring during said transmission forward drive modes, and whereby said predetermined uniform concentric clearance is provided between the outer diameter of said enlarged thrust head portion and the diameter of said second bore during said transmission forward drive modes.

3. The transmission reverse idler gear shaft arrangement as set forth in claim 2, wherein the diameters of said shank portion and said thrust head portions are each about 0.30 mm smaller than their associated first and second bores, such that said concentric clearance is of the order of 0.15 mm.

* * * * *